US00H002253H

(19) United States
(12) Statutory Invention Registration
Petrovic et al.

(10) Reg. No.: US H2253 H
(43) Published: May 3, 2011

(54) MULTIPLE PERSONALITY ARTICULATION FOR ANIMATED CHARACTERS

(75) Inventors: Lena Petrovic, Oakland, CA (US); John Anderson, San Anselmo, CA (US)

(73) Assignee: Pixar, Emeryville, CA (US)

(21) Appl. No.: 12/215,666

(22) Filed: Jun. 26, 2008

(65) Prior Publication Data

US 2010/0302252 A1 Dec. 2, 2010

(51) Int. Cl.
*G06T 13/00* (2006.01)

(52) U.S. Cl. ..... 345/473
(58) Field of Classification Search ..... 345/473
See application file for complete search history.

(56) References Cited

U.S. PATENT DOCUMENTS 7,098,910 B2 * 8/2006 Petrovic et al. ..... 345/420
7,327,360 B2 * 2/2008 Petrovic et al. ..... 345/426
7,450,122 B2 * 11/2008 Petrovic et al. ..... 345/473
7,468,730 B2 * 12/2008 Petrovic et al. ..... 345/473
7,548,243 B2 * 6/2009 Peachey ..... 345/473
2004/0227757 A1 * 11/2004 Petrovic et al. ..... 345/426
2005/0210994 A1 * 9/2005 Petrovic et al. ..... 73/760
2005/0212800 A1 * 9/2005 Petrovic et al. ..... 345/426
2005/0212803 A1 * 9/2005 Peachey ..... 345/473
2005/0253842 A1 * 11/2005 Petrovic et al. ..... 345/419

* cited by examiner

*Primary Examiner*—Dan Pihulic
(74) *Attorney, Agent, or Firm*—Stephen Y. Pang

(57) ABSTRACT

A method for a computer system includes determining a model for a first personality of a component of an object, wherein the model for the first personality of the component is associated with a component name and a first personality indicia, determining a model for a second personality of the component of the object, wherein the model for the second personality of the component is associated with the component name and the second personality indicia, determining a multiple personality model of the object, wherein the model of the object includes the model for the first personality of the component, the model of the second personality of the component, the first personality indicia, and the second personality indicia, and storing the multiple personality model of the object in a single file.

6 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTIPLE PERSONALITY ARTICULATION FOR ANIMATED CHARACTERS

The present invention relates to computer animation. More specifically, embodiments of the present invention relate to methods and apparatus for creating and using multiple personality articulation object models.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation/computer generated imagery (CGI) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007) and others. In addition to creating animated features, Pixar developed computing platforms specially designed for computer animation and CGI, now known as RenderMan®. RenderMan® is now widely used in the film industry and the inventors of the present invention have been recognized for their contributions to RenderMan® with multiple Academy Awards®.

One core functional aspect of RenderMan® software was the use of a "rendering engine" to convert geometric and/or mathematical descriptions of objects into images or data that are combined into other images. This process is known in the industry as "rendering." For movies or other features, a user (known as a modeler/rigger) specifies the geometric description of objects (e.g. characters), and a user (known as an animator) specifies poses and motions for the objects or portions of the objects. In some examples, the geometric description of objects includes a number of controls, e.g. animation variables (avars), and values for the controls (avars).

As the rendering power of computers increased, users began to define and animate objects with higher levels of detail and higher levels of geometric complexity. The amount of data required to describe such objects therefore greatly increased. As a result, the amount of data required to store a scene that included many different objects (e.g. characters) also dramatically increased.

One approach developed by Pixar to manage such massive amounts of data has been through the use of modular components for objects. With this approach, an object may be separated into a number of logical components, where each of these logical components are stored in a separate data file. Further information is found in U.S. application Ser. No. 10/810,487 now U.S. Pat. No. 7,548,243 filed May 26, 2004, incorporated by reference herein for all purposes.

An issue contemplated by the inventors of the present invention is that this modular component approach required very careful file management, as objects could be created from thousands of disparate components. This approach tended to require the freezing of on-disk storage locations or paths or storage of components as soon as the components were used in a model. If the storage location of one file was moved or not located in a specified path, that component would fail to load, and the model of the object would be "broken." The inventors of the present invention thus believe that it is undesirable to hard-code disk storage locations, as it greatly restricts the ability of users, e.g. modelers, to update and change models of components, for example.

Another issue contemplated by the inventors of the present invention is that the time required to open thousands of different files making up an object is large. In cases where components of an object are stored in hard-coded storage locations, the inventors believe that locating thousands of files, opening thousands of files from disk, and transferring such data to working memory is very time consuming. In cases where components of an object are stored in a database, the inventors believe that retrieving thousands of files is even more inefficient compared to the hard-coded storage approach.

In light of the above, what is desired are methods and apparatus that address many of the issues described above.

BRIEF SUMMARY OF THE INVENTION

The present invention relates to methods and apparatus for providing and using multiple personality articulation models. More specifically, embodiments of the present invention relate to providing objects having consistent animation variable naming among multiple personalities of objects.

Various embodiments of the present invention allow users, such as an object modeler or rigger to create a single model of an object that can include multiple personalities. Such personalities can be expressed in the form of alternative descriptions for a given object component. As merely an example, alternative descriptions for object components may include different types of heads for an object, different types of arms, different types of body shape, different types of surface properties, and the like. Typically, each of the alternative descriptions may include a common or identical component name/animation variable.

In various embodiments of the present invention, the multiple personality object is retrieved in the working environment of the user, such as an animator, a game player, etc. This typically includes retrieval of a single file, at one time, that includes each of the personalities for a given object component. Next, the user or the program the user uses (e.g. game), specifies the personality that is to be expressed. Then, using the common component name/animation variable, the object is animated (e.g. posed or manipulated) while reflecting the desired personality. Because one file may include the different personalities, file management overhead, compared to file-referencing schemes, is greatly reduced.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Figure 1:
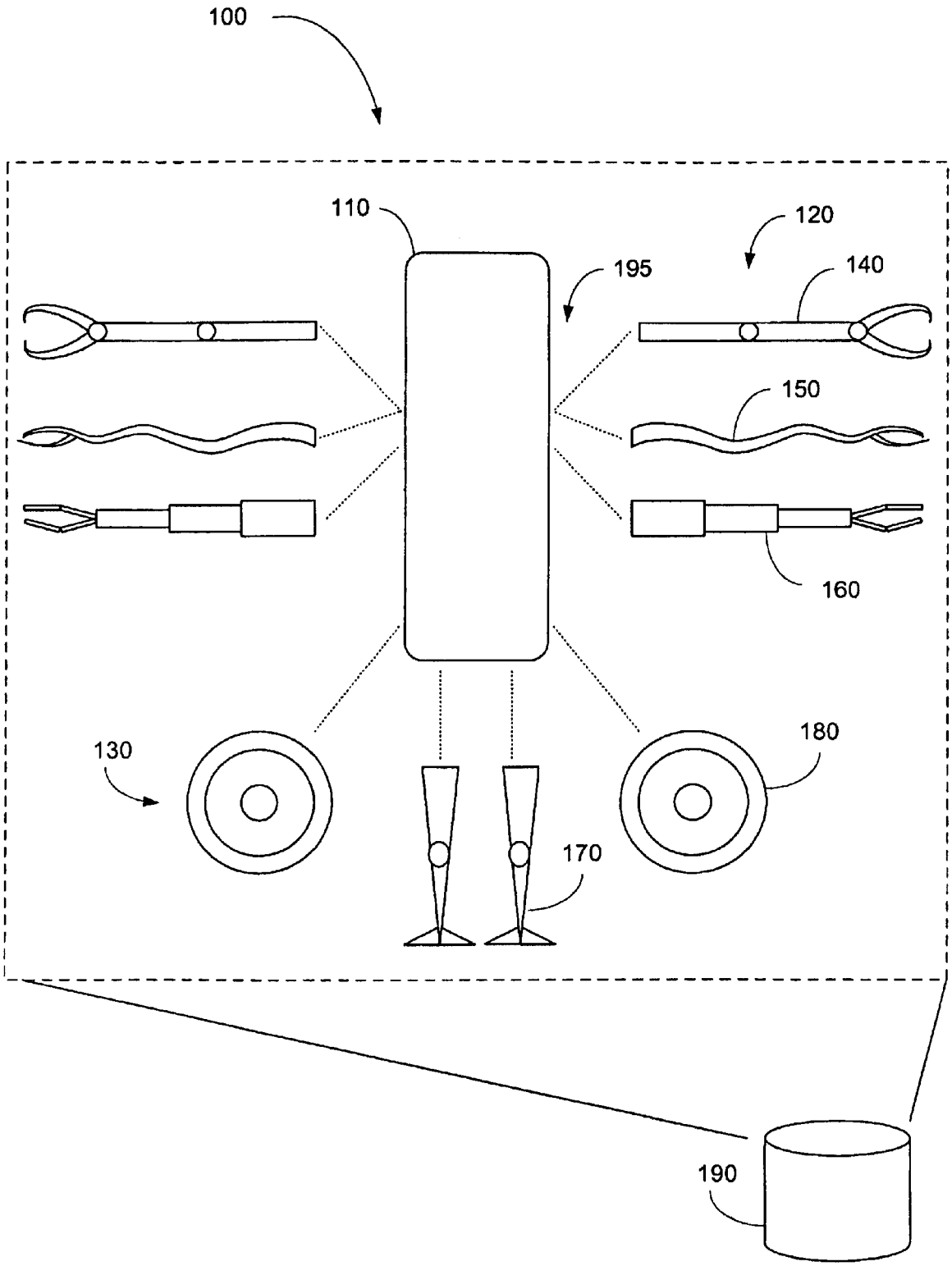
FIG. 1 illustrates an example according to various embodiments of the present invention.

FIG. 1 illustrates various embodiments of the present invention. More specifically, FIG. 1 illustrates a multiple personality object 100 within a working environment such as an object modeling environment. As illustrated in this example, a multiple personality object includes a body portion 110, and a number of personalities 120 for "arms" and a number of personalities 130 for "legs".

In various embodiments, a user, such as a modeler or rigger specifies the different personalities to be expressed from the multiple personality object 100. In the example illustrated, a claw-type arm 140, a tentacle-type arm 150, and an antenna type arm 160 are shown. In various embodiments, each of these personalities may be associated with an identifier, such as a personality identifier, a version number, or the like. Also illustrated are two personalities for legs : legs 170 and wheels 180. In various embodiments, the leg type personalities can also be associated with a personality identifier, version number, or the like.

In FIG. 1, a personality A (e.g. version A) is associated with claw type arm 140 and legs 170, personality B (version B) is associated with tentacle type arm 150 and wheels 180, and personality C is associated with antenna type arm 160, and wheels 180. In other embodiments, different personality identifiers may be specified for each personality of each component. As an example, personality identifiers A-C may be respectively associated with personalities 120 for "arms" and personality identifiers D-E may be respectively associated with personalities 130 for legs.

As can be seen in FIG. 1, the different personalities of the components need not be connected to the same portion of body portion 110. For example, arms 140 and 150 connect to different portions of body portion 110 than arms 160, and legs 170 connect to the bottom of body portion 110 and wheels 180 connect to the sides of body portion 110.

In various embodiments, a personality need not be specified for each multiple personality component. For example, an object may have arms 160, but no personality specified for its legs.

Figure 2:
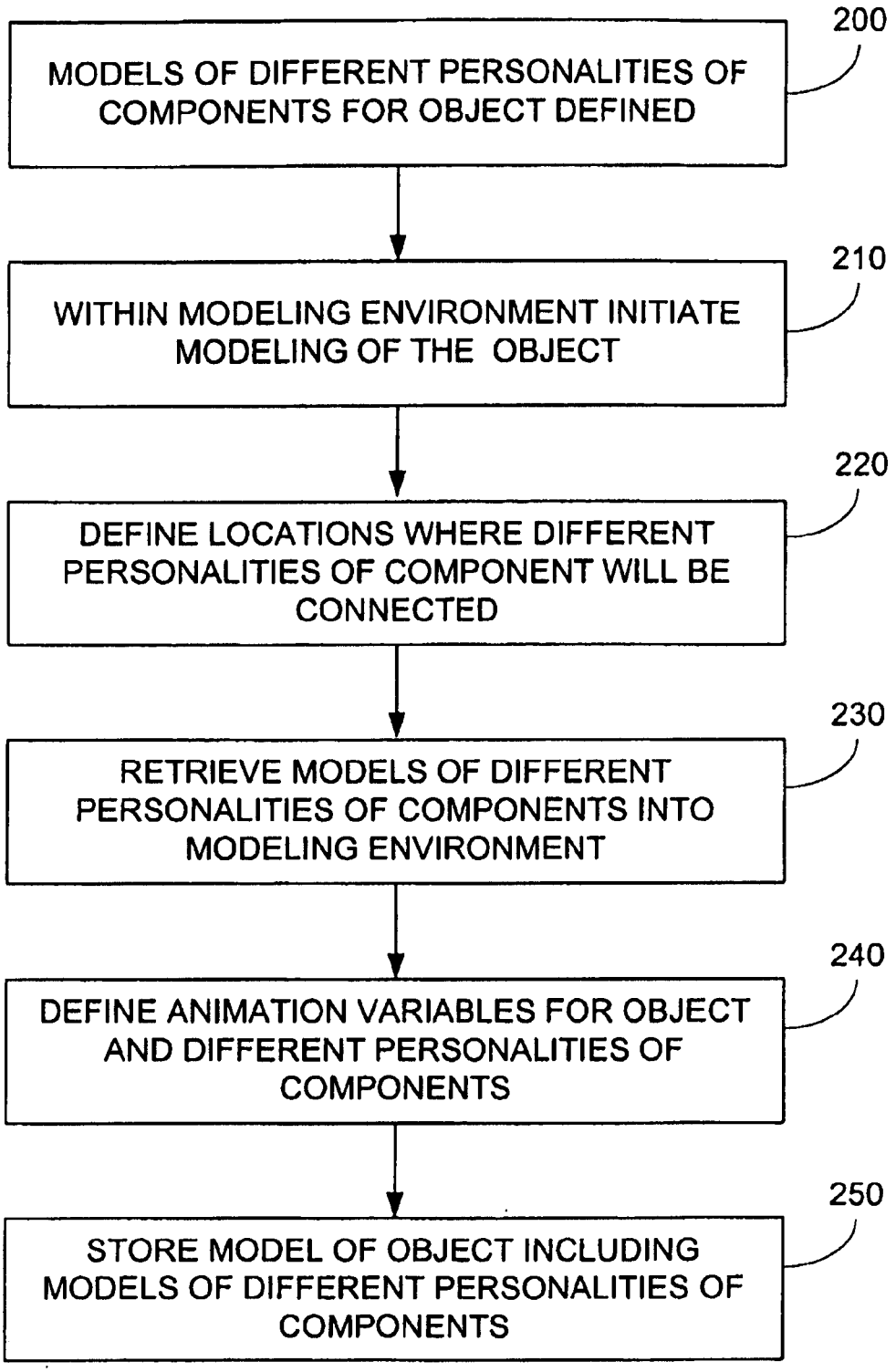
FIG. 2 illustrates a flow diagram according to various embodiments of the present invention.

FIG. 2 illustrates a flow diagram according to various embodiments of the present invention. More specifically, FIG. 2 illustrates a process for creating an object with multiple personalities.

Initially, a number of different personalities for a component are determined, step 200. In various embodiments, a number of different users may contribute for the definition of the different personalities. Typically, users (e.g. modelers) create models of the different personalities for components of an object. In various examples, the modeler may specify the geometric construction of the component (e.g. joints, connection of parts, etc.); the surface of the component (e.g. hair, scales, etc.); and the like. Additionally, users (e.g. riggers) specify connections for different portions of the components together and provides control points (e.g. animation variables, etc.) for moving the portions of the component in a coordinated manner. These different personalities for a component may be initially created and stored in a memory for later use.

Next, in FIG. 2, a user initiates a modeling environment and initiates definition of an object that will include a component having different personalities, step 210. In various embodiments, the user may specify the component having different personalities before defining other portions of the object, or may define other portions of the object before specifying a component to have multiple personalities. In various embodiments, an entire object may be defined having components with different personalities. For example, a model for an object may require a "type A" head, "type D" body, "type N" arms, "type N" legs, or the like.

In various embodiments, the Pixar modeling environment Menv may be used. However, it is contemplated that other embodiments of the present invention may utilize other modeling environments.

In various embodiments, the user may specify the location where the multi-personality component is to be coupled to other portions of the object, step 220. Referring to the example in FIG. 1, the user may specify that the personalities 120 for "arms" are coupled to positions 195 on the object. In some embodiments, each of the different personalities may be associated with different positions on the object. For example, personality A type arms may be connected to the front surface of an object, whereas personality B type arms may be connected to the back surface of an object, or the like.

Next, the models of the different personalities for the component are retrieved from disk and loaded within the modeling environment, step 230. This may be done by physically opening each of the models of the different personalities within the modeling environment. In various embodiments, the user may be able to view the different personalities for components, in a similar manner as was illustrated in FIG. 1.

In various embodiments, additional control variables may be specified for the object with each of the different personalities, if desired step 240. As mentioned above, animation variables may be specified that controls more than one component (and each personality of components) of the object at the same time. In various embodiments, a user may specify a similar reaction for different mortalities for an animation variable, and in other embodiments, the modeler may specify different reactions for different personalities for an animation variable. As an example, for personality "A" and "B" arms, a "surprised" animation variable value of 1.0 may be associated with the arms being raised up, and 0.0 may be associated with the arms being next to the object body. As another example, in contrast, with the above example, with personality "B" arms, a "surprised" animation variable of 1.0 may be associated with the arms of the object being elongated and touching the floor, and 0.0 may be associated with the arms being fully "retracted" into the object.

In various embodiments, after definition of the multiple personality object, the object along with more than one model of personality of the multiple personality components are stored in a tangible media, such as a hard disk, a network storage, optical storage media, database, or the like, step 250.

Figure 3:
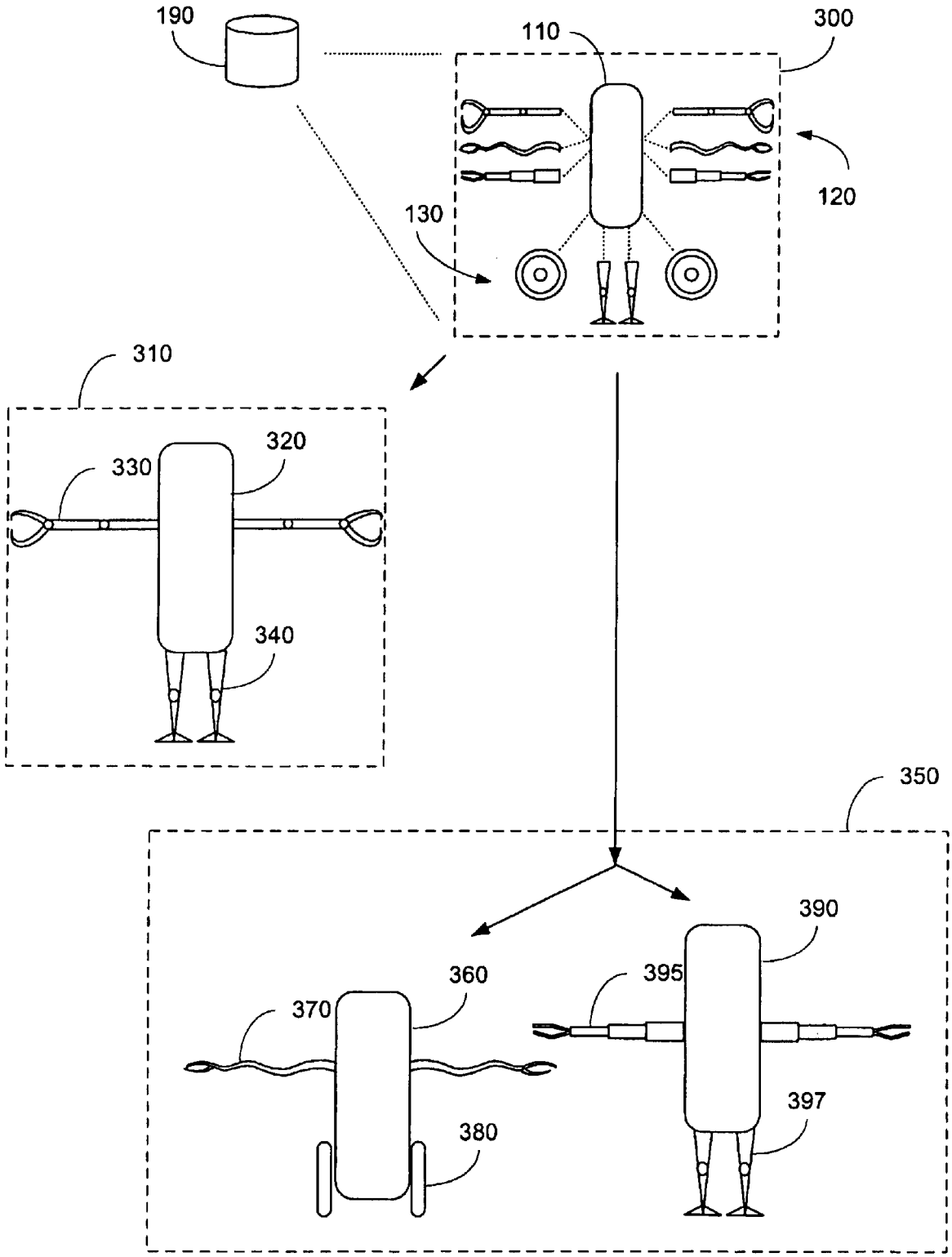
FIG. 3 illustrates an example according to various embodiments of the present invention.

FIG. 3 illustrates various embodiments of the present invention. More specifically, FIG. 3 illustrates retrieval of a model 300 of a multiple personality object into a working environment, e.g. an animation environment, a video game environment, etc. As illustrated in this example, multiple personality object 300 is the same as multiple personality object 100 in FIG. 1, and includes body portion 110, and a number of personalities 120 for "arms" and a number of personalities 130 for "legs."

In a first example, in a first environment 310, a first personality for the multiple personality object 300 is desired, such as personality A, in FIG. 1. In response, only personality A components are provided for object 320 for the user within environment 310. Specifically, as illustrated, object 320 includes claw-type arms 330 and legs 340.

In a second example, in a second environment 350, a different personality for the multiple personality object 300 is desired, such as personality B, in FIG. 1. In response, only personality B components are provided for object 300 within environment 350. Specifically, as illustrated, object 360 includes tentacle-type arms 370 and wheels 380. Still within environment 350, a different personality for the multiple personality object 300 may be desired, such as personality C, in FIG. 1. In response, personality C components are provided to the user for object 390, as shown by antenna-type arms 395 and legs 397.

In FIG. 3, it is envisioned that only one copy of object 300 be retrieved from memory 190 into environment 350. In this example, object 300 may serve as the template for the different personalities of the objects illustrated. Such embodiments could greatly reduce the amount of time required to generate, for example, an army of objects with different personalities.

Within each of the respective working environments, the respective objects can then be manipulated or posed based upon output of software, e.g. video game software, crowd simulation software; based upon specification by a user, e.g. via the use of animation variables, inverse kinematics software; or the like.

Figure 4A:
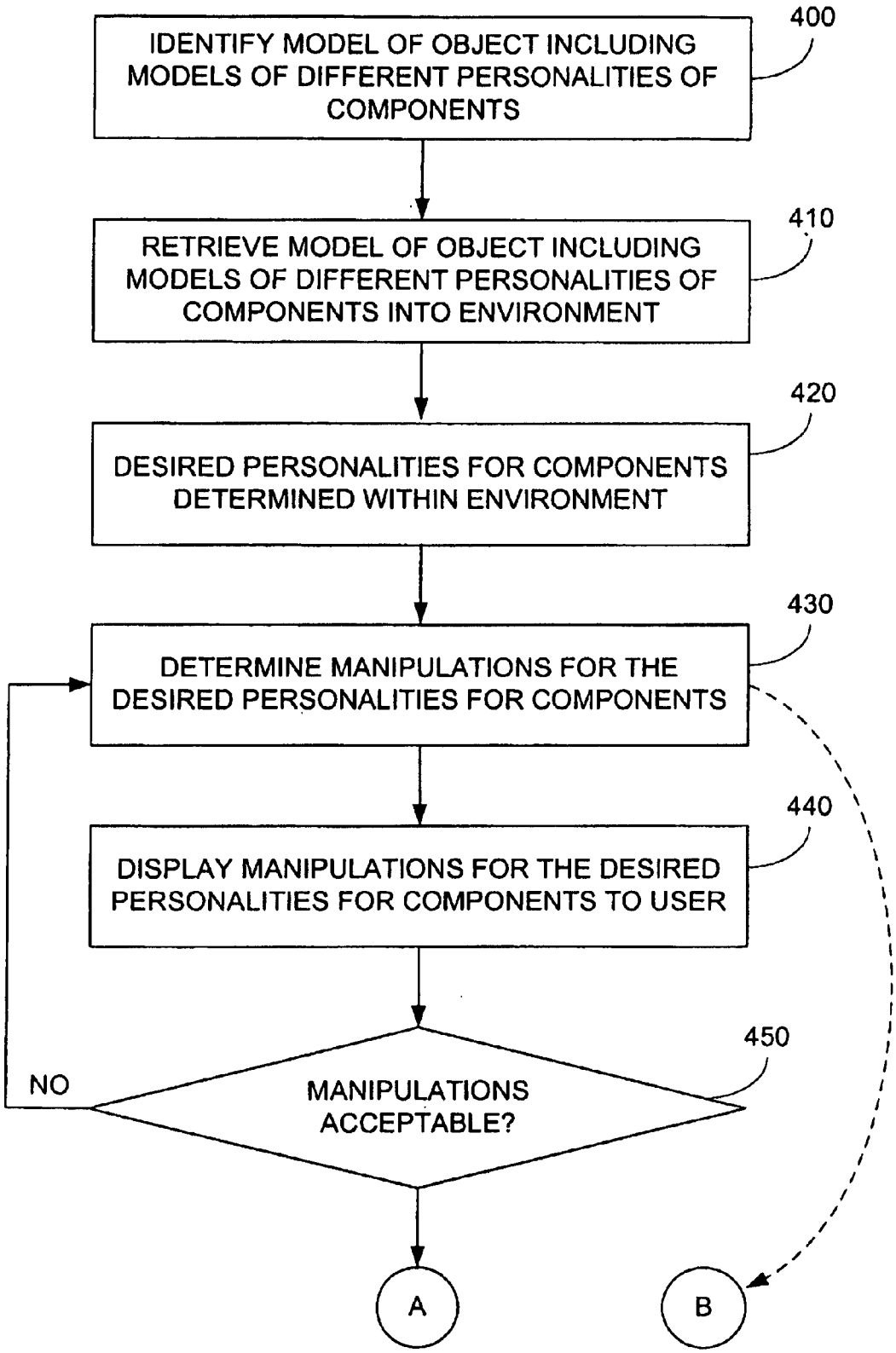
FIGS. 4A-B illustrate a flow diagram according to various embodiments of the present invention.
Figure 4B:
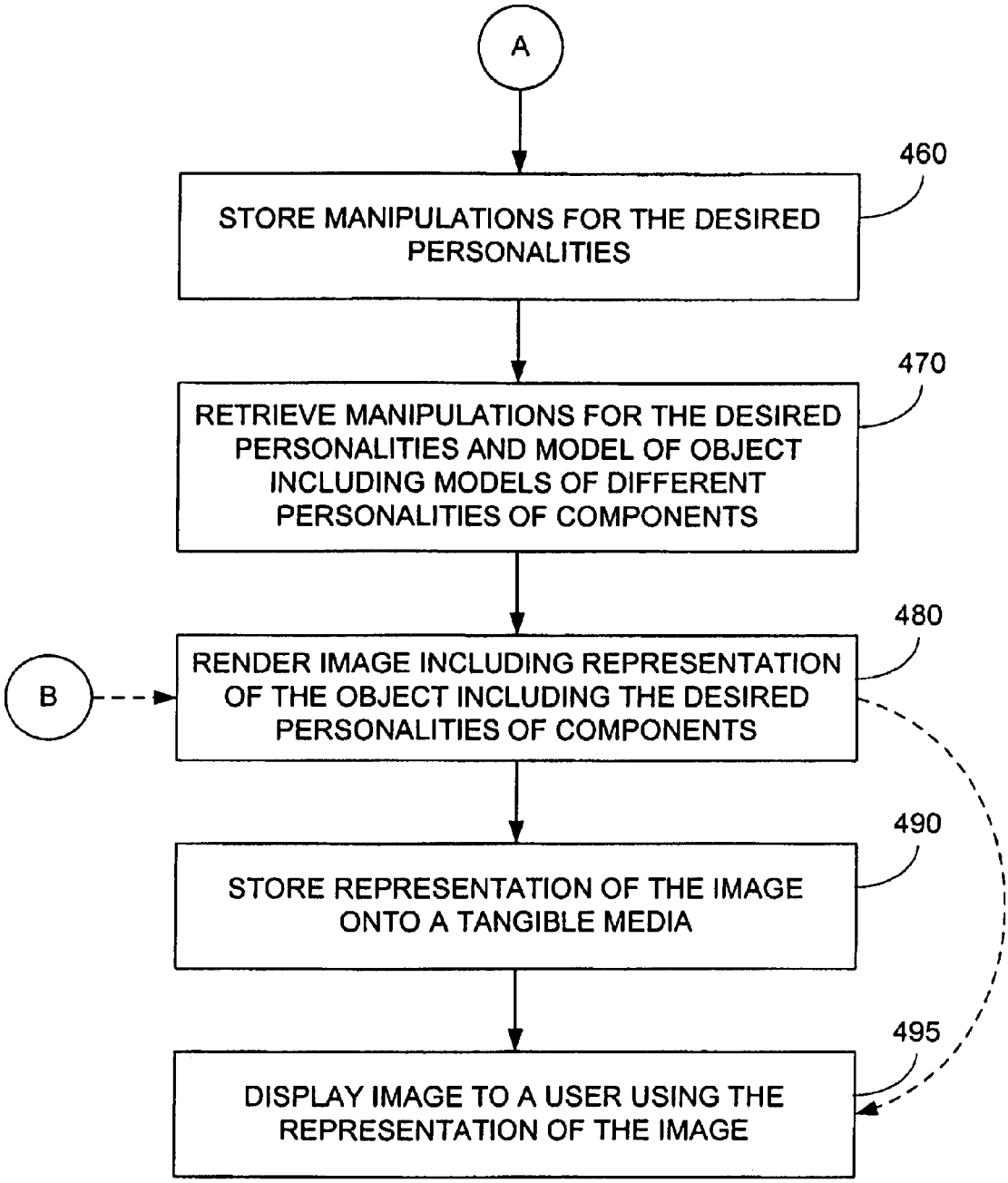

FIGS. 4A-B illustrate a flow diagram according to various embodiments of the present invention. More specifically, FIGS. 4A-B illustrate a process for manipulating an object with multiple personalities. In some embodiments of the present invention, the object is used for non-real-time animation (e.g. defining animation for feature animation), real-time animation (e.g. video games), or the like.

Initially, a model of an object with multiple personality components is identified, step 400. In various embodiments, the object may be identified by a user, by a computer program, or the like. In various embodiments, the computer program may be a video game, where in-game characters or other non-player characters are to be shown on the screen. In another embodiment, the computer program may be a crowd-simulation (multi-agent) type computer program that can specify/identify the different objects (agents) to form a crowd of objects. In one specific embodiment, software available from Massive Software from Auckland, New Zealand, is used, although other brands of multi-agent software may also be used. In various embodiments, such software typically relies upon a user, e.g. an animator to broadly specify the types of agents, or objects for the crowd.

Next, the model of the object including all the multiple personality components stored therein is retrieved from memory (e.g. optical memory, network memory) and loaded into a computer working memory, step 410. As discussed in the background, it is believed that opening one file including an object with multiple personalities is potentially more time efficient than opening many different files to "build-up" a specific configuration of an object.

In various embodiments of the present invention, the desired personality for components of the object are determined, step 420. In some embodiments, the specific personality type is specifically selected by a user, or specified by a computer program. For example, in a video game situation, an object may be a soldier-type character, and the different personalities may reflect different equipment being worn by the soldier. As another example, a crowd-simulation computer program may specify a personality type for an object. In aggregate, for a crowd of objects, such software may select personalities for objects such that the crowd appears random, the crowd includes small groups of objects, or the like. As illustrated in the example in FIG. 3, above, object 360 was specified to express personality B, and object 400 was specified to express personality C. Accordingly, object 360 includes tentacle type arms 370 and object 390 includes antenna-type arms 395.

Next, in various embodiments, manipulations of the specific personality of object specified may be determined, step 430. The manipulation is typically specified in a pre-run-time environment. In various embodiments of the present invention, a user such as an animator may manipulate the desired personality for the object via manipulation (e.g. GUI, keyboard) of animation variables, via inverse kinematics software, or the like. In other embodiments, the specified manipulation of the object may be determined via software, e.g. crowd simulation software, video game engine, artificial intelligence software, or the like.

In various embodiments, the manipulations of the object may be viewed or reviewed, step 440. In various embodiments, a user such as an animator may review the animation of the object within an animation environment. In various embodiments, this review may not be a full rendering of an image, but a preview rendering.

In other embodiments, such as video gaming, this step may also include displaying the animation of the object on a display to a user, such as a game developer. It is envisioned in this context, that the types of animation of in-game characters may include animation of "scripted" behavior.

In some embodiments of the present invention, after preview of the animation, the user may approve of the manipulations, step 450. Changes to versions of specific components of the object may be performed, even after step 450. For example, the animator may select decide to replace arms 150 with 160. The manipulations (e.g. animation variables) may then be stored into a memory, step 460. In context of animation, the stored manipulations may be animation of the object, and in the context of a video game, these stored manipulations may be associated with "scripted" behavior for the object.

Subsequently, at rendering run-time, the stored manipulations may be retrieved from memory, step 470, and used to animate the object. In various embodiments, an image of a scene including the posed object including the specified personality components, is then created, step 480. In the case of animation, the images are stored onto a tangible media, such as film media, an optical disk, a magnetic media, or the like, step 490. The representation of the images can later be retrieved and viewing by viewers, (e.g. audience) step 495.

In some embodiments of the present invention directed towards video games, step 430 may be based upon input from a user or the game. As an example, the user may move the character on the screen by hitting keys on a keyboard, such as A,S,D, or W. This input would be used as input to animate the character on the screen to walk left, right, backwards, or forwards, or the like. Additionally, in-game health-type conditions of a character may also influence (e.g. restrict) movement of portions of that object. As an example, the right leg of the character may be injured and splinted, thus the animation of the right leg of the object may have a restricted range of movement.

In such video game embodiments, an image of the scene including the object can then be directly rendered in step 480. In contrast to the embodiments above, no review or storage of these inputs is thus required. The rendered image is then displayed to the user in step 495.

Figure 5:
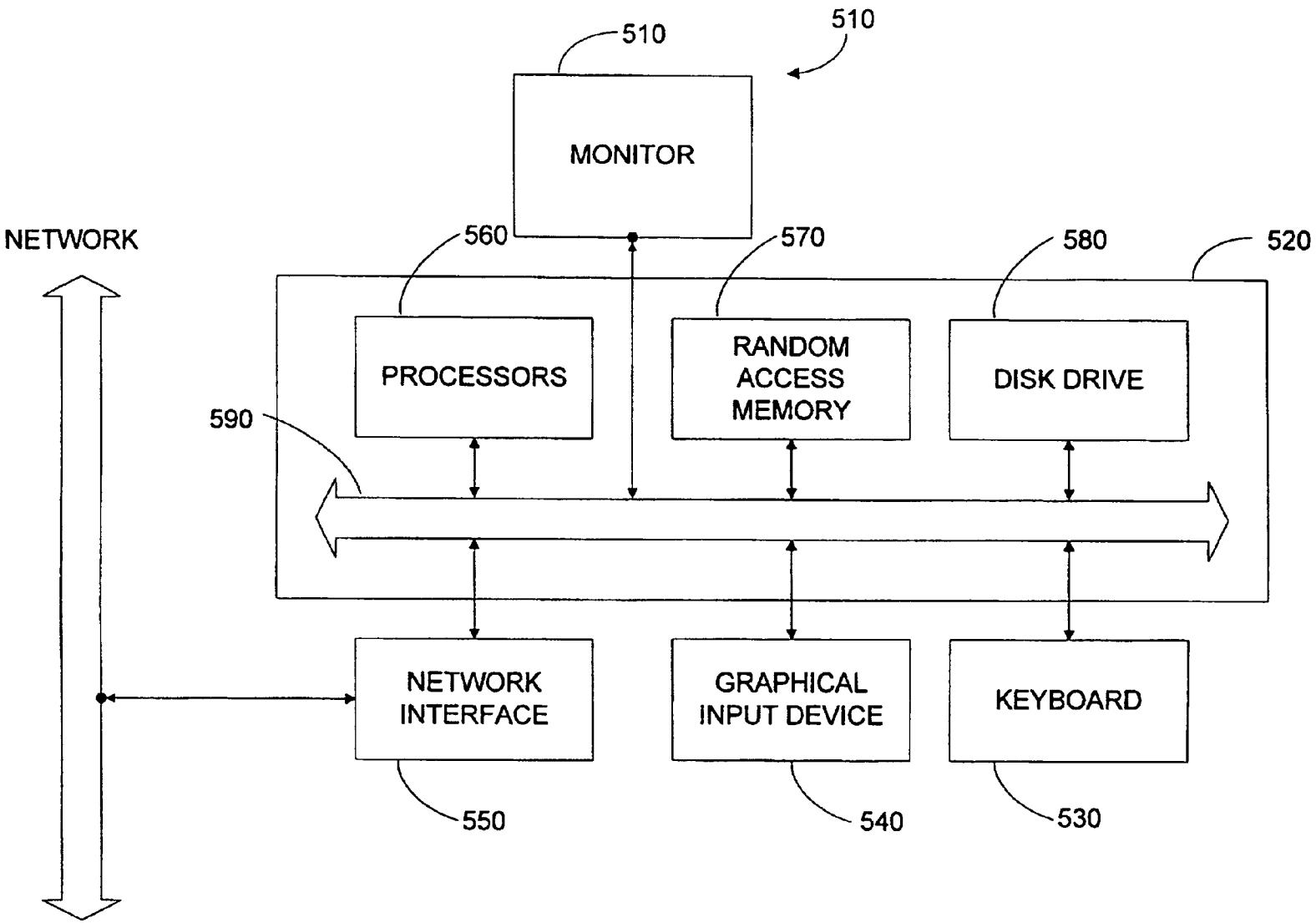
FIG. 5 is a block diagram of typical computer system according to an embodiment of the present invention.

FIG. 5 is a block diagram of typical computer system 500 according to an embodiment of the present invention.

In the present embodiment, computer system 500 typically includes a display 510, computer 520, a keyboard 530, a user input device 540, computer interfaces 550, and the like.

In various embodiments, display (monitor) 510 may be embodied as a CRT display, an LCD display, a plasma display, a direct-projection or rear-projection DLP, a microdisplay, or the like. In various embodiments, display 510 may be used to visually display user interfaces, images, or the like.

In various embodiments, user input device 540 is typically embodied as a computer mouse, a trackball, a track pad, a joystick, wireless remote, drawing tablet, voice command system, eye tracking system, and the like. User input device 540 typically allows a user to select objects, icons, text and the like that appear on the display 510 via a command such as a click of a button or the like.

Embodiments of computer interfaces 550 typically include an Ethernet card, a modem (telephone, satellite, cable, ISDN), (asynchronous) digital subscriber line (DSL) unit, FireWire interface, USB interface, and the like. For example, computer interfaces 550 may be coupled to a computer network, to a FireWire bus, or the like. In other embodiments, computer interfaces 550 may be physically integrated on the motherboard of computer 520, may be a software program, such as soft DSL, or the like.

In various embodiments, computer 520 typically includes familiar computer components such as a processor 560, and memory storage devices, such as a random access memory (RAM) 570, disk drives 580, and system bus 590 interconnecting the above components.

In some embodiments, computer 520 includes one or more Xeon microprocessors from Intel. Further, in the present embodiment, computer 520 typically includes a UNIX-based operating system.

RAM 570 and disk drive 580 are examples of computer-readable tangible media configured to store data such as geometrical descriptions of different personality components, models including multiple personality components, procedural descriptions of models, values of animation variables associated with animation of an object, embodiments of the present invention, including computer-executable computer code, or the like. Types of tangible media include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like.

In the present embodiment, computer system 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 5 representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Core™ microprocessors from Intel; Phenom™, Turion™ 64 , Opteron™ or Athlon™ microprocessors from Advanced Micro Devices, Inc; and the like. Further, other types of operating systems are contemplated, such as WindowsVista®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In various embodiments of the present invention, animation of an object having a first personality may be easily reused by an object having a second personality. In other words, animation used for one version of an object can be used for other versions of the object, since they simply have different versions of the same components. From a nomenclature point of view, an object having a first version of a component will have a directory path that can be used by an object having a second version of the component. In various embodiments, the consistency in nomenclature, or naming, facilitates animation reuse. Accordingly, after animation for an object is finished, the user can easily change the version of a component, without having to worry about finding the correct directory path for the component.

In other embodiments of the present invention, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system includes:

determining a model for a first personality of a component of an object, wherein the model for the first personality of the component is associated with a component name and a first personality indicia;

determining a model for a second personality of the component of the object, wherein the model for the second personality of the component is associated with the component name and the second personality indicia;

determining a multiple personality model of the object, wherein the multiple personality model of the object includes the model for the first personality of the component, the model of the second personality of the component, the first personality indicia, and the second personality indicia; and storing the multiple personality model of the object in a single file.

2. The method of claim 1 retrieving the multiple personality model of the object within a working environment;

receiving a specification of the first personality indicia and the component name within the working environment;

receiving a manipulation value for the component of the object; and applying the manipulation value for the component to the model of the first personality of the component in response to the component name, the specification of the first personality indicia, and to the manipulation value.

3. The method of claim 2 further comprising:

determining a representation of an image including a representation of the manipulation value being applied to the model of the first personality of the component; and displaying the image to a user.

4. The method of claim 3 wherein the working environment is selected from a group consisting of: an animation environment, a gaming environment.

5. A method for a computer system includes:

retrieving a multiple personality model of an object from a file, wherein the multiple personality model of the object includes a model of a first personality of a component, wherein the model for the first personality of the component is associated with a component name, and a first personality indicia, wherein the multiple personality of the model of the object includes a model of a second personality of the component, wherein the model for the second personality of the component is associated with the component name and a second personality indicia;

determining a desired personality indicia associated with the component;

determining a plurality of manipulation values associated with the component;

associating the plurality of manipulation values to the model for the first personality of the component when the desired personality indicia comprises the first personality indicia; and associating the plurality of manipulation values to the model for the second personality of the component when the desired personality indicia comprises the second personality indicia.

6. The method of claim 1 further comprising rendering an image using the model of the first personality of the component when the desired personality indicia comprises the first personality indicia.

* * * * *